(12) United States Patent
Takagi et al.

(10) Patent No.: US 7,369,731 B2
(45) Date of Patent: May 6, 2008

(54) OPTICAL FIBER FOR AMPLIFICATION, OPTICAL AMPLIFYING APPARATUS, LIGHT SOURCE APPARATUS, PHOTO-THERAPY APPARATUS, AND EXPOSURE APPARATUS

(75) Inventors: Masahiro Takagi, Yokohama (JP); Motoki Kakui, Yokohama (JP); Akira Tokuhisa, Tokyo (JP); Soichi Owa, Kumagaya (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 48 days.

(21) Appl. No.: 11/130,410

(22) Filed: May 17, 2005

(65) Prior Publication Data

US 2006/0263018 A1  Nov. 23, 2006

(51) Int. Cl.
*G02B 6/02* (2006.01)
(52) U.S. Cl. .................. 385/123; 385/38; 359/341.3
(58) Field of Classification Search ............ 385/38, 385/123; 359/341.3–341.33
See application file for complete search history.

(56) References Cited

U.S. PATENT DOCUMENTS

| | | | |
|---|---|---|---|
| 6,937,810 B2* | 8/2005 | Kashiwada et al. | 385/142 |
| 2002/0114600 A1* | 8/2002 | Aiso et al. | 385/123 |
| 2003/0103196 A1* | 6/2003 | Hirukawa | 355/55 |
| 2005/0271347 A1* | 12/2005 | Kimball et al. | 385/142 |
| 2006/0103919 A1* | 5/2006 | DiGiovanni et al. | 359/341.5 |
| 2006/0262387 A1 | 11/2006 | Haruna et al. | |

FOREIGN PATENT DOCUMENTS

| | | |
|---|---|---|
| JP | 2001-083557 | 3/2001 |
| JP | 2001-085771 | 3/2001 |
| JP | 2001-356378 | 12/2001 |

OTHER PUBLICATIONS

Ohtsuki; "UV Source by Efficient Nonlinear Frequency Conversion from Fiber Amplifiers"; *Laser Review*: c.2001; pp. 94-98; vol. 23, No. 2.

(Continued)

*Primary Examiner*—Sung Pak
*Assistant Examiner*—Jerry Rahll
(74) *Attorney, Agent, or Firm*—McDermott Will & Emery LLP

(57) ABSTRACT

The present invention relates to an optical fiber for amplification, an optical amplifying apparatus, and so on, having a structure for enabling increase of power of output light, suppression of occurrence of nonlinear optical phenomena, and compact storage all together. The optical amplifying apparatus comprises an optical fiber for amplification amplifying input light inputted together with pumping light from a pumping light source. The optical fiber for amplification comprises a core region doped with a rare-earth element, and a cladding region provided on an outer periphery of the core region and having a refractive index lower than that of the core region. The core region has an outer diameter of 10 μm or more but 30 μm or less, and has a relative refractive index difference of 0.5% or more but 2.0% or less with respect to the cladding region. The cladding region has an outer diameter of 75 μm or more but 200 μm or less.

9 Claims, 13 Drawing Sheets

OTHER PUBLICATIONS

Taverner et al.; "158-µJ Pulses from a Single-Transverse-Mode, Large-Mode-Area Erbium-Doped Fiber Amplifier"; *Optics Letters*; c. 1997; pp. 378-380; vol. 22, No. 6.

Fermann; "Single-Mode Excitation of Multimode Fibers with Ultrashort Pulses"; *Optics Letters*; c. 1998; pp. 52-54; vol. 23, No. 1.

Fermann et al.; "High-Power 100-fs Pulse Generation by Frequency Doubling of an Erbium-ytterbium-fiber Master Oscillator Power Amplifier"; *Optics Letters*; c. 1998; pp. 1840-1842; vol. 23, No. 23.

Galvanauskas et al.; "13-W Average Power Ultrafast Fiber Laser"; pp. 663-664.

* cited by examiner

Fig.4

| | CORE DIAMETER 2a ($\mu$m) | RELATIVE REFRACTIVE INDEX DIFFERENCE $\Delta$(%) | Er-DOPING CONCENTRATION (wt.ppm) | ABSORPTION LOSS PEAK $\alpha$ (dB/m) | POWER OF MAXIMUM OUTPUT PEAK (kW) |
|---|---|---|---|---|---|
| SAMPLE | 13 | 1.2 | 1500 | 37.0 | 24 |
| COMPARATIVE EXAMPLE | 6.2 | 1.1 | 1500 | 27.1 | 4.7 |

OPTICAL FIBER FOR AMPLIFICATION, OPTICAL AMPLIFYING APPARATUS, LIGHT SOURCE APPARATUS, PHOTO-THERAPY APPARATUS, AND EXPOSURE APPARATUS

BACKGROUND OF THE INVENTION

1. Field of the Invention

The present invention relates to an optical fiber for amplification amplifying light with a predetermined wavelength, an optical amplifying apparatus, a light source apparatus, a photo-therapy apparatus, and an exposure apparatus.

2. Related Background Art

An optical amplifying apparatus includes an optical fiber for amplification having a core region doped with a rare-earth element, as an optical amplifying medium, and under supply of pumping light into this optical fiber for amplification, signal light is amplified in this optical fiber for amplification. For example, an optical amplifying apparatus in which an Er doped fiber is applied as an optical amplifying medium is able to amplify signal light containing multiple channels in the 1.55 μm wavelength band generally used in an optical communication system, and is thus installed in an optical repeater or the like of the optical communication system.

On the other hand, such an optical amplifying apparatus is also under study on use as a high-output light source for generating ultraviolet light through wavelength conversion. For example, the technology described in (Document 1) Tomoko OHTSUKI, "UV Source by Efficient Nonlinear Frequency Conversion from Fiber Amplifiers," Laser Review, Vol. 23, No. 2, pp. 94-98, February 2001 is to guide high-output infrared light emitted from the optical amplifying apparatus, into a nonlinear optical crystal, thereby generate harmonics in the nonlinear optical crystal, and output ultraviolet light from the nonlinear optical crystal.

SUMMARY OF THE INVENTION

The Inventor conducted research on the above-described conventional technology and found the following problems. Namely, the technology described in the Document 1 requires the optical amplifying apparatus to satisfy the following requirements: (1) to provide a high power of output light; (2) to suppress occurrence of nonlinear optical phenomena in the optical fiber for amplification; (3) to enable compact storage of the optical fiber for amplification.

However, as the power of output light increases, the nonlinear optical phenomena become more likely to occur in the optical fiber for amplification. In other words, there is a trade-off relation between the increase of power of output light and the suppression of occurrence of the nonlinear optical phenomena.

The occurrence of the nonlinear optical phenomena can be suppressed by increasing the effective area of the optical fiber for amplification, but it will result in increasing the bending loss of the optical fiber for amplification, which will make it difficult to achieve the compact storage of the optical fiber for amplification. In other words, there is a trade-off relation between the suppression of occurrence of the nonlinear optical phenomena and the compact storage of the optical fiber for amplification.

The present invention has been accomplished in order to solve the problems as described above, and an object of the present invention is to provide an optical fiber for amplification in a structure for enabling the increase of the power of the output light, the suppression of occurrence of the nonlinear optical phenomena, and the compact storage all together, an optical amplifying apparatus including the optical fiber for amplification, a light source apparatus including the optical fiber for amplification, a photo-therapy apparatus including the light source apparatus, and an exposure apparatus including the light source apparatus.

An optical fiber for amplification according to the present invention comprises a core region doped with a rare-earth element, and a cladding region provided on an outer periphery of the core region and having a refractive index lower than that of the core region. In particular, the core region has an outer diameter of 10 μm or more but 30 μm or less, and has a relative refractive index difference of 0.5% or more but 2.0% or less with respect to the cladding region. The cladding region has an outer diameter of 75 μm or more but 200 μm or less.

The outer diameter of the core region (core diameter) may be 15 μm or more but 27 μm or less. The outer diameter of the cladding region (cladding diameter) may be 110 μm or more but 150 μm or less. The relative refractive index difference of the core region to the cladding region may be 0.7% or more but 1.5% or less.

The optical fiber for amplification having the structure as described above successfully achieves the increase of the power of output light, the suppression of occurrence of the nonlinear optical phenomena, and the compact storage all together.

In the optical fiber for amplification according to the present invention, the rare-earth element as a dopant in the core region is preferably Er, and a doping concentration thereof (Er doping concentration) is preferably 800 wt.ppm or more. The optical fiber for amplification preferably has an absorption loss peak of 20 dB/m or more but 80 dB/m or less near the wavelength of 1530 nm. In this case, the optical fiber for amplification is able to amplify light in the 1.5-1.6 μm wavelength band.

An optical amplifying apparatus according to the present invention comprises the optical fiber for amplification having the structure as described above (the optical fiber for amplification according to the present invention), and pumping light supplying means for supplying pumping light into the optical fiber for amplification. In the optical amplifying apparatus, the pumping light supplying means supplies the pumping light into the optical fiber for amplification and the optical fiber for amplification amplifies optical signal.

The optical amplifying apparatus according to the present invention may further comprise a first connection fiber disposed between an entrance fiber located on the light entrance side of the optical fiber for amplification, and the optical fiber for amplification. In this configuration, the first connection fiber preferably has a mode field diameter larger than a mode field diameter of the entrance fiber but smaller than a mode field diameter of the optical fiber for amplification. On the other hand, the optical amplifying apparatus according to the present invention may further comprise a second connection fiber disposed between an exit fiber located on the light exit side of the optical fiber for amplification, and the optical fiber for amplification. In this configuration, the second connection fiber preferably has a mode field diameter larger than a mode field diameter of the exit fiber but smaller than the mode field diameter of the optical fiber for amplification. By the configuration gradually varying the mode field diameter on at least one of ends of the optical fiber for amplification, a loss of amplified light or pumping light due to the discontinuity of mode field diameter can be reduced in an optical propagation path from the light entrance side toward the light exit side. The output light is also obtained with high power in this respect.

In the optical amplifying apparatus according to the present invention, the optical fiber for amplification is preferably wound in a coil form with a minimum bending radius of 15 mm or more. In this case, the optical amplifying apparatus is obtained in compact structure. In this configuration, since the optical fiber for amplification applied to the optical amplifying apparatus has the structure as described above, the increase of bending loss is effectively suppressed, and as a result, the output light is obtained with high power on a stable basis.

A light source apparatus according to the present invention comprises a signal generator for generating electric signals, a semiconductor laser for generating a laser beam on the basis of the electric signals, and an optical fiber amplifier for amplifying the laser beam from the semiconductor laser, and the optical fiber amplifier comprises the optical fiber for amplification having the structure as described above (the optical fiber for amplification according to the present invention). The light source apparatus may comprise another optical fiber amplifier upstream of the foregoing optical fiber amplifier. In this case, preferably, the electric signals are of pulse shape and the semiconductor laser generates pulsed light.

A photo-therapy apparatus according to the present invention comprises the light source apparatus having the structure as described above (the light source apparatus according to the present invention), a wavelength converter, and an irradiation optical system. The wavelength converter converts irradiation light emitted from an outlet of the light source apparatus, to therapy irradiation light with a predetermined wavelength. The irradiation optical system guides the irradiation light converted by the wavelength converter, to a part to be treated.

An exposure apparatus according to the present invention comprises the light source apparatus having the structure as described above (the light source apparatus according to the present invention), a wavelength converter, a first stage capable of holding a photomask, a second stage capable of holding an exposure object to be exposed, an illumination optical system, and a projection optical system. The wavelength converter converts irradiation light emitted from an outlet of the light source apparatus, to irradiation light of a predetermined wavelength. The photomask held by the first stage is provided with a predetermined exposure pattern. The illumination optical system illuminates the photomask held by the first stage, with the irradiation light converted by the wavelength converter. The projection optical system projects the irradiation light having impinged through the illumination optical system onto the photomask and having passed through the photomask, onto the exposure object held by the second stage.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a table showing a list of specifications of each of a sample produced as an optical fiber for amplification according to the present invention, and a comparative example;

DETAILED DESCRIPTION OF THE PREFERRED EMBODIMENTS

Embodiments of an optical fiber for amplification, an optical amplifying apparatus, a light source apparatus, a photo-therapy apparatus, and an exposure apparatus according to the present invention will be described below in detail with reference to FIGS. 1, 2A, 2B, 3-8, 9A-9E, and 10-13. The same elements will be denoted by the same reference symbols in the description of the drawings, without redundant description.

Embodiment of Optical Amplifying Apparatus and Optical Fiber for Amplification

Figure 1:
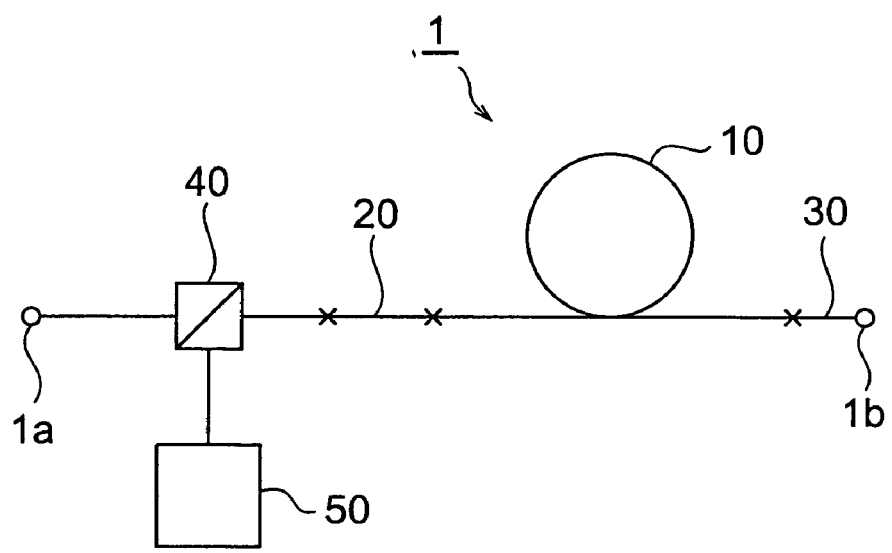
FIG. 1 is an illustration showing a schematic configuration of an embodiment of an optical amplifying apparatus according to the present invention.

First, an embodiment of the optical amplifying apparatus and the optical fiber for amplification according to the present invention will be described. FIG. 1 is an illustration showing a schematic configuration of an embodiment of an optical amplifying apparatus according to the present invention. The optical amplifying apparatus 1 shown in FIG. 1 is an apparatus for amplifying light inputted through input end 1a and for outputting the amplified light through output end 1b, and has an optical fiber for amplification 10, a connection fiber 20 (first connection fiber), a connection fiber 30 (second connection fiber), an optical coupler 40, and a pumping light source 50.

The optical fiber for amplification 10 is an optical fiber mainly comprised of silica glass, and it has a core region doped with a rare-earth element and a cladding region provided on an outer periphery of the core region. In particular, in the optical fiber for amplification 10, the core region preferably contains Er as the rare-earth element and the doping concentration of Er in the core region is preferably 800 wt.ppm or more. In the optical fiber for amplification 10, the core region may be co-doped with Al or La. In addition, the optical fiber for amplification 10 preferably has an absorption loss peak of 20 dB/m or more but 80 dB/m or less, near the wavelength of 1530 nm.

As will be described later, the mode field diameter of the optical fiber for amplification 10 is larger than those of typical single-mode optical fibers. The optical fiber for amplification 10 is wound with a coil form in the minimum bending radius of 15 mm or more.

At the end located on the input end 1a side, the optical fiber for amplification 10 is fusion-spliced to the connection fiber 20, and is optically connected through this connection fiber 20 to an output port of optical coupler 40 (normally, a typical single-mode optical fiber). The connection fiber 20 is located between the optical fiber for amplification 10 and the output port of optical coupler 40. The mode field diameter of the connection fiber 20 is larger than the mode field diameter at the output port of the optical coupler 40 but smaller than the mode field diameter of the optical fiber for amplification 10.

At the end located on the output end 1b side, the optical fiber for amplification 10 is fusion-spliced to the connection fiber 30, and is optically connected through this connection fiber 30 to the output end 1b. The connection fiber 30 is located between an optical fiber connected to the output end 1b (normally, a typical single-mode optical fiber) and the optical fiber for amplification 10. The mode field diameter of the connection fiber 30 is larger than the mode field diameter of the optical fiber connected to the output end 1b but smaller than the mode field diameter of the optical fiber for amplification 10.

The optical coupler 40 outputs light reached through the input end 1a, to the optical fiber for amplification 10 and also outputs the pumping light emitted from the pumping light source 50, to the optical fiber for amplification 10. The pumping light source 50 outputs the pumping light with a wavelength capable of pumping the rare-earth element as a dopant in the optical fiber for amplification 10. The optical coupler 40 and the pumping light source 50 constitute a pumping light supplying means for supplying the pumping light to the optical fiber for amplification 10. For example, in a case where the rare-earth element as a dopant in the optical fiber for amplification 10 is Er, the wavelength of the pumping light is near 1.48 µm or near 0.98 µm, and the wavelength of amplified light is in the 1.5-1.6 µm band.

The optical amplifying apparatus 1 operates as follows. The pumping light outputted from the pumping light source 50 is supplied via the optical coupler 40 and connection fiber 20 into the optical fiber for amplification 10 to pumping the rare-earth element as a dopant in the optical fiber for amplification 10. The light inputted through the input end 1a travels via the optical coupler 40 and the connection fiber 20 into the optical fiber for amplification 10, and is amplified in this optical fiber for amplification 10. The amplified light travels via the connection fiber 30, and is outputted through the output end 1b to the outside of the apparatus. In this embodiment, thanks to the application of the connection fibers 20, 30, the mode field diameters of the light propagation paths located at both ends of the optical fiber for amplification 10 vary gradually, which reduces the loss of the amplified light or pumping light due to the discontinuity of mode field diameter. As a result, the output light with high power can be obtained.

Figure 2A:
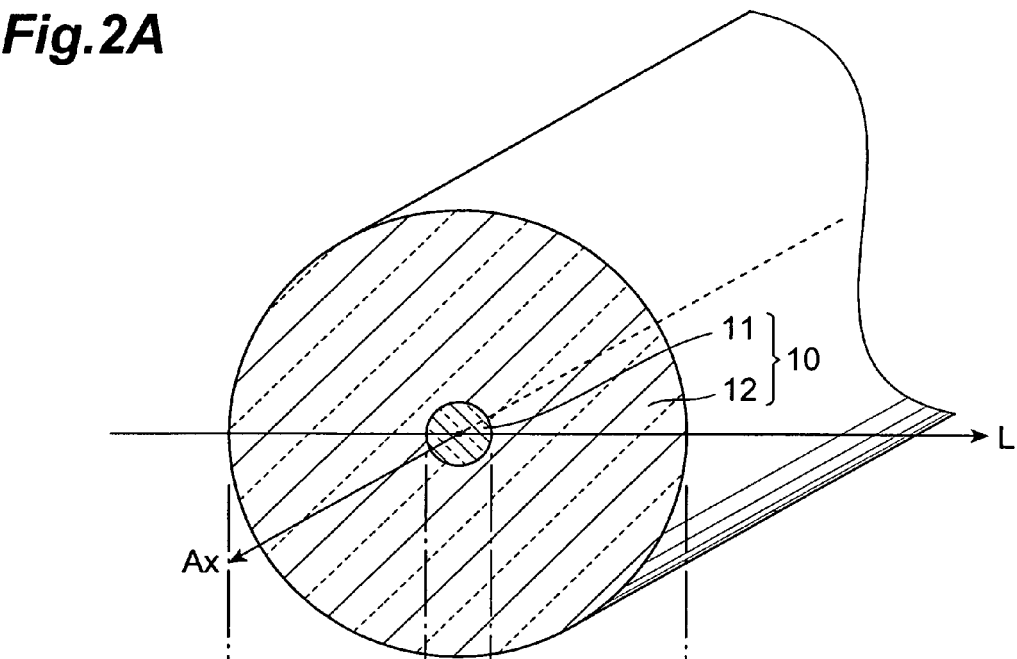
FIG. 2A is an illustration showing a sectional configuration of an embodiment of an optical fiber for amplification according to the present invention.
Figure 2B:
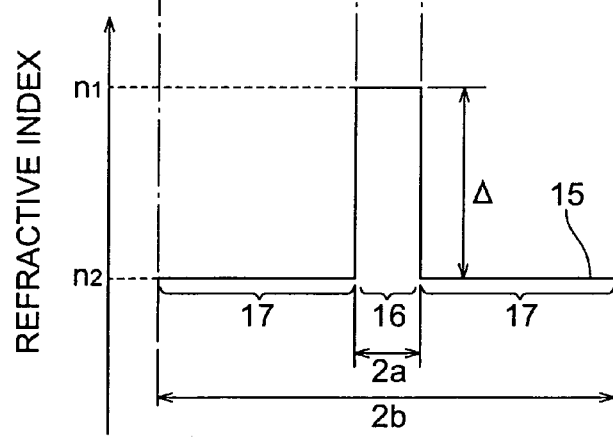
FIG. 2B is a refractive index profile thereof.

FIG. 2A is an illustration showing the sectional structure of the optical fiber for amplification 10 shown in FIG. 1, and FIG. 2B is an index profile thereof. FIG. 2A shows a cross section of the optical fiber for amplification 10 as cut by a plane normal to the optical axis AX. FIG. 2B is the index profile 15 of the optical fiber for amplification 10 and shows refractive indices of respective portions along a line L normal to the optical axis AX.

As shown in FIG. 2A, the optical fiber for amplification 10 comprises a core region 11 extending along the optical axis AX and doped with a rare-earth element, and a cladding region 12 provided on an outer periphery of the core region 11 and having a refractive index lower than that of the core region 11. The core region 11 has the outer diameter $2a$ of 10 µm or more but 30 µm or less, and the cladding region 12 has an outer diameter $2b$ of 75 µm or more but 200 µm or less. The relative refractive index difference $\Delta$ of the core region 11 with respect to the cladding region 12 is 0.5% or more but 2.0% or less.

The outer diameter $2a$ of the core region 11 (core diameter) may be 15 µm or more but 27 µm or less, and the outer diameter $2b$ of the cladding region 12 (cladding diameter) may be 110 µm or more but 150 µm or less. The relative refractive index difference $\Delta$ of the core region 11 with respect to the cladding region 12 may be 0.7% or more but 1.5% or less. As the optical fiber for amplification 10 is configured as described above, it becomes feasible to implement the increase of power of output light, the suppression of occurrence of the nonlinear optical phenomena, and the compact storage all together. The optical fiber for amplification 10, even wound in the coil form, demonstrates a sufficiently small bending loss as long as the minimum bending radius is 15 mm or more.

Figure 3:
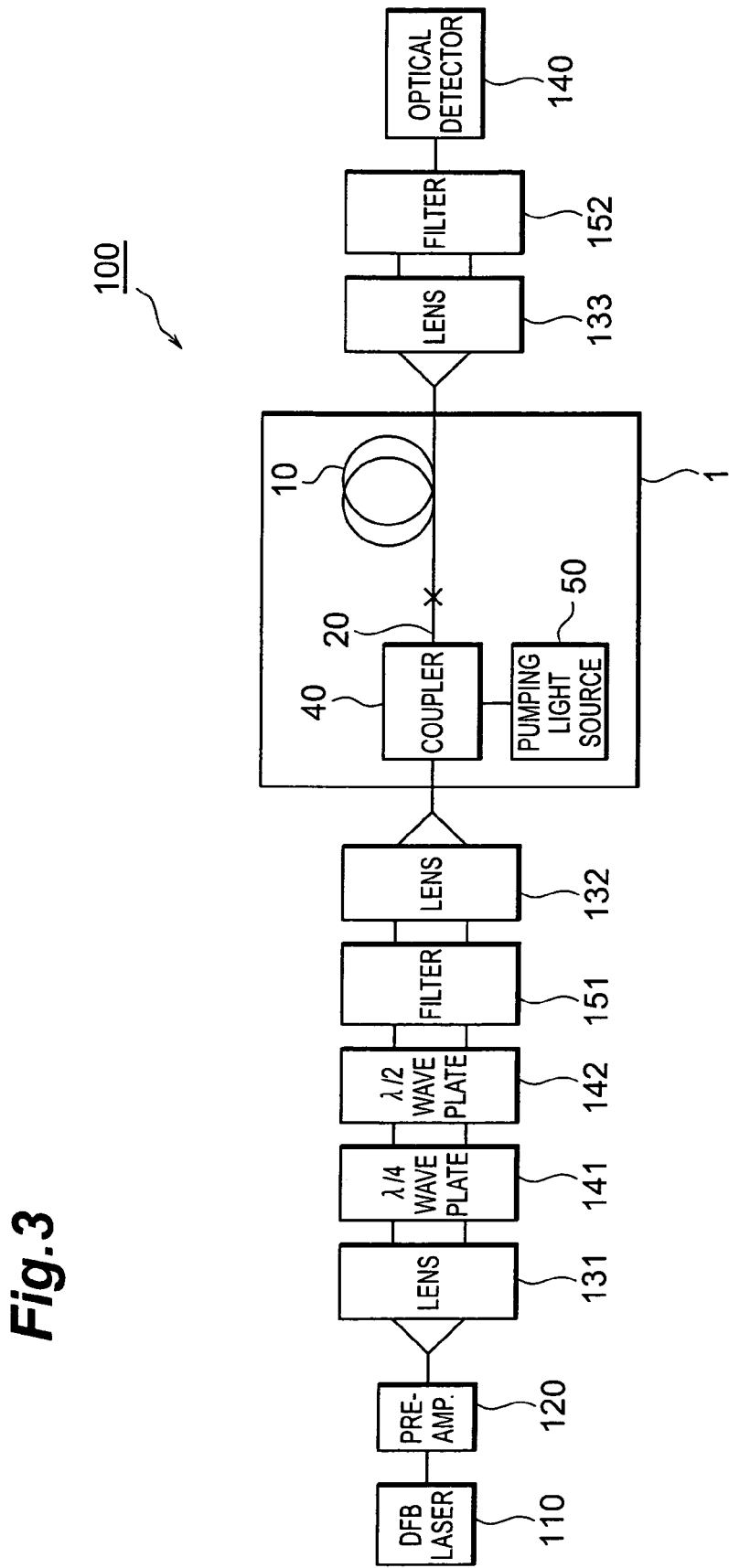
FIG. 3 is an illustration showing a schematic configuration of an evaluation system for evaluating the optical amplifying apparatus shown in FIG. 1 and the optical fiber for amplification shown in FIGS. 2A and 2B.

FIG. 3 is an illustration showing a schematic configuration of an evaluation system for evaluating the optical amplifying apparatus 1 and the optical fiber for amplification 10 according to the present invention. The evaluation system 100 shown in FIG. 3 has a DFB laser source 110, a preamplifier 120, a lens 131, a quarter-wave plate 141; a half-wave plate 142, a filter 151, a lens 132, the optical amplifying apparatus 1 (see FIG. 1), a lens 133, a filter 152, and an optical detector 140 in order. In the evaluation system 100, light emitted from the DFB laser source 110 is amplified by the preamplifier 120 and the amplified light is collimated by the lens 131. The collimated light is subjected to regulation of its polarization by the quarter-wave plate 141 and the half-wave plate 142, and thereafter the filter 151 transmits only a specific wavelength component. The wavelength component passing through the filter 151 is condensed by the lens 132 and is guided to the input end of the optical amplifying apparatus 1. Then, the light outputted from the output end of the optical amplifying apparatus 1 is collimated by the lens 133. The filter 152 transmits only a specific wavelength component out of the collimated light. Finally, the optical detector 140 detects the power of the wavelength component transmitted by the filter 152.

FIG. 4 is a table showing a list of specifications of each of a sample produced as the optical fiber for amplification 10 (the optical fiber for amplification according to the present invention), and a comparative example. Each of the optical fiber for amplification of the sample and the optical fiber for amplification of the comparative example has a length of 2 m, and comprises the core region doped with Er, and the cladding region having the outer diameter of 125 µm.

These optical fiber for amplifications are obtained by sequentially carrying out a first step of depositing fine particles of glass comprised essentially of silica glass and containing Ge, onto an internal wall of a glass tube by MCVD, a second step of effecting doping with Er and Al by a liquid impregnation method, a third step of consolidating the fine particle and collapsing the glass tube after the second step, to obtain a fiber preform, and a fourth step of drawing this fiber preform. FIG. 4 presents the outer diameter 2a of the core region (core diameter), the relative refractive index difference Δ of the core region with respect to the cladding region, the Er doping concentration in the core region, the absorption loss peak α, and the power of maximum output peak, for each of the optical fiber for amplification of the sample and the optical fiber for amplification of the comparative example. The power of maximum output peak was evaluated using the evaluation system 100 shown in FIG. 3. The wavelength of pumping light was 1.48 µm.

The optical fiber for amplification of the comparative example is a typical single-mode optical fiber having the core diameter 2a of 6.2 µm, and demonstrated the following values: 1.1% as the relative refractive index difference Δ of the core region with respect to the cladding region; 1500 wt.ppm as the Er doping concentration in the core region; 27.1 dB/m as the absorption loss peak a near the wavelength of 1530 nm. The optical fiber for amplification of the sample has the core diameter 2a of 13 µm larger than those of ordinary fibers, and demonstrated the following values: 1.2% as the relative refractive index difference Δ of the core region with respect to the cladding region; 1500 wt.ppm as the Er doping concentration in the core region; 37.0 dB/m as the absorption loss peak a near the wavelength of 1530 nm.

Figure 5:
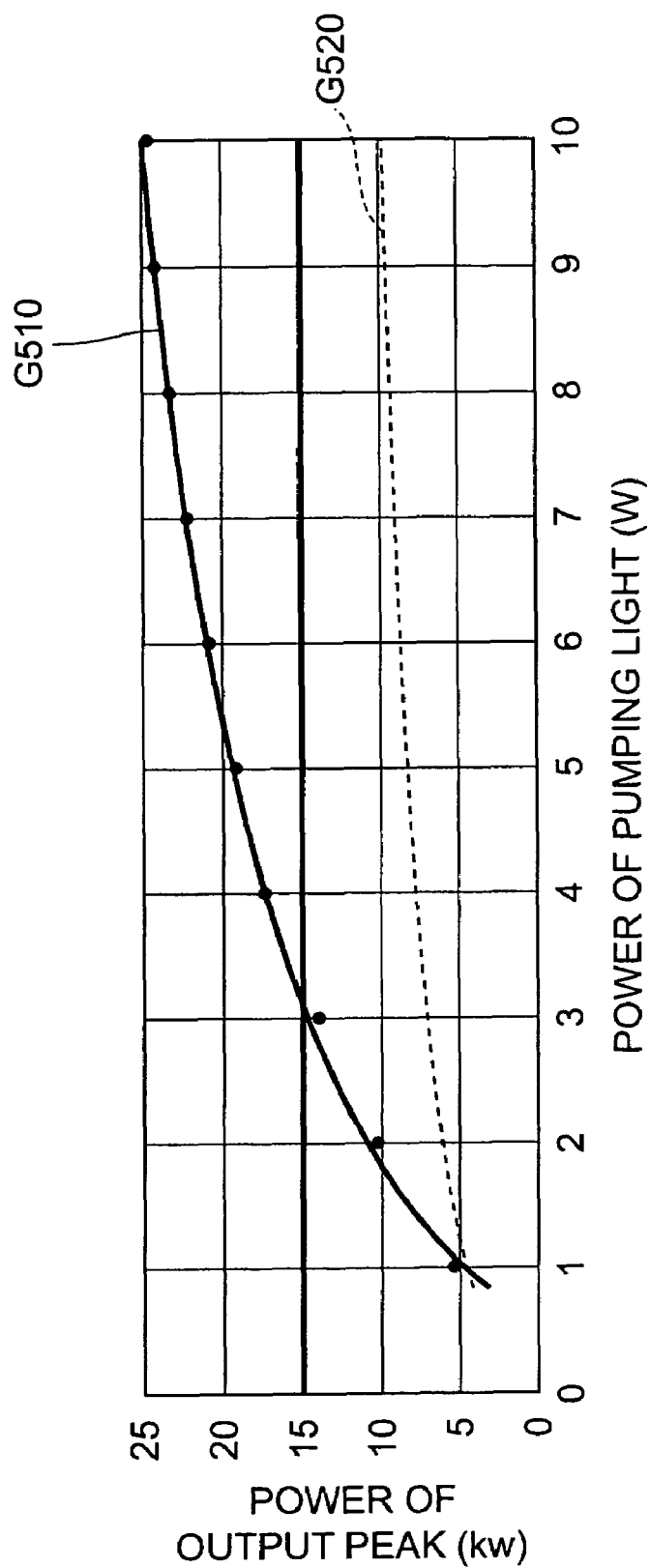
FIG. 5 is a graph showing a relation between power of pumping light and power of output peak, for each of the optical fiber for amplification of the sample and the optical fiber for amplification of the comparative example shown in FIG. 4.

FIG. 5 is a graph showing the relation between power of pumping light and power of output peak, for each of the optical fiber for amplification of the sample and the optical fiber for amplification of the comparative example. In FIG. 5, graph G510 represents the result of measurement with the optical fiber for amplification of the sample, and graph G520 the result of measurement with the optical fiber for amplification of the comparative example. As apparent from FIG. 5, the optical fiber for amplification of the comparative example comes to generate prominent noise light due to the nonlinear optical phenomena with increase of the power of pumping light and thus increases power allocation to noise light. Therefore, the optical fiber for amplification of the comparative example showed such a tendency that the power of output peak became saturated at about 5 kW even with increase of the pumping power over about 1 W. In contrast to it, the optical fiber for amplification of the sample demonstrated the power of output peak of 15 kW or more with the pumping power of 4 W or more, and the power of the maximum output peak was 24 kW.

The generation efficiency η of noise light due to the nonlinear optical phenomena is proportional to the square of the fiber length L and inversely proportional to the square of the effective area $A_{eff}$. The Er doped fiber is often used in a state in which the unsaturated absorption (the product of absorption loss peak α and fiber length L) due to Er is set at a predetermined value. The effective area is proportional to the square of the mode field diameter MFD. In this case, the generation efficiency η of nonlinear noise light is proportional to $1/(\alpha^2 \times MFD^4)$.

Figure 6:
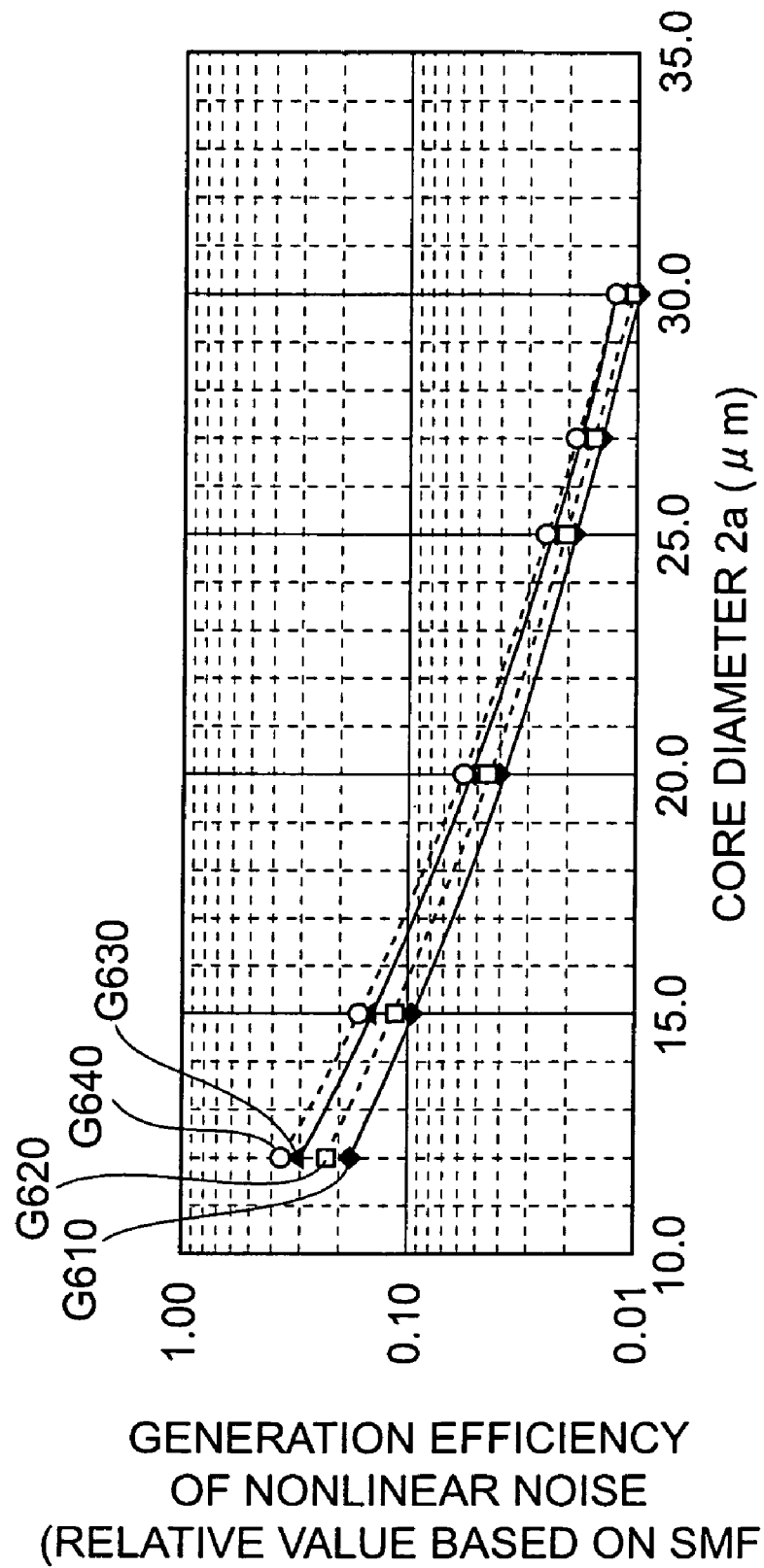
FIG. 6 is a graph showing a relation between core diameter $2a$ and generation efficiency $\eta$ of nonlinear noise, for each of optical fiber for amplifications different in relative refractive index difference $\Delta$.
Figure 7:
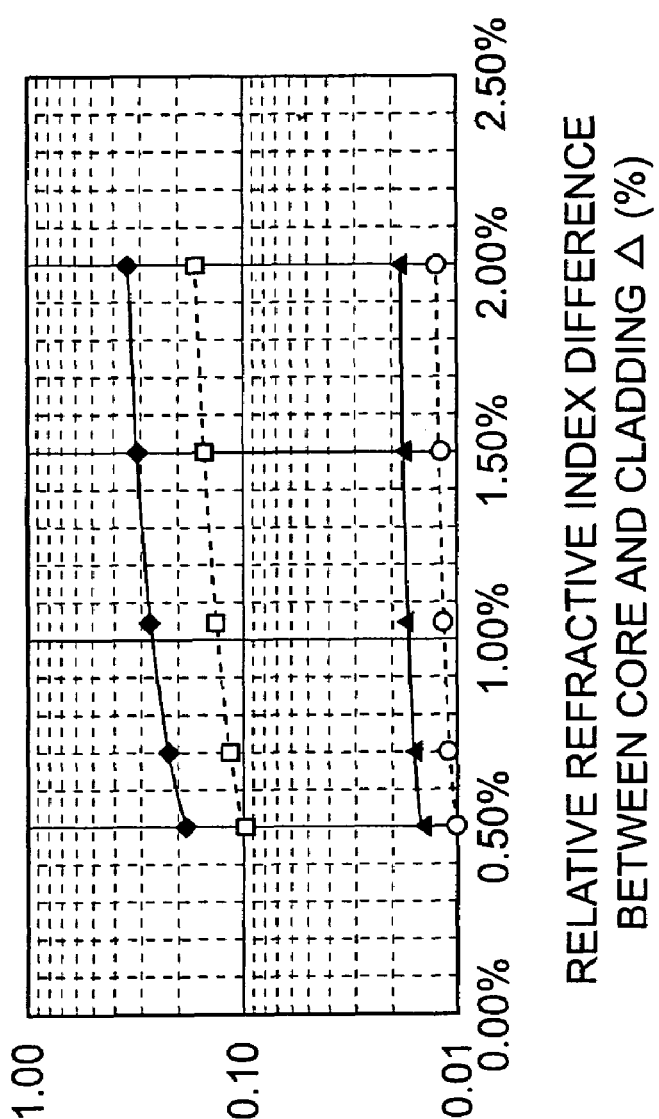
FIG. 7 is a graph showing a relation between relative refractive index difference $\Delta$ and generation efficiency $\eta$ of nonlinear noise, for each of optical fiber for amplifications different in core diameter $2a$.

FIG. 6 is a graph showing the relation between core diameter 2a and generation efficiency η of nonlinear noise light, for each of optical fiber for amplifications different in the relative refractive index difference Δ. FIG. 7 is a graph showing the relation between relative refractive index difference Δ and generation efficiency η of nonlinear noise light, for each of optical fiber for amplifications different in the core diameter 2a. In the both graphs of FIGS. 6 and 7, the generation efficiency η of nonlinear noise light is indicated as relative values based on values in the optical fiber for amplification of the comparative example. In FIG. 6, graph G610 represents the measurement result with the optical fiber for amplification having the relative refractive index difference Δ of 0.50%, graph G620 that with the optical fiber for amplification having the relative refractive index difference Δ of 0.70%, graph G630 that with the optical fiber for amplification having the relative refractive index difference Δ of 1.50%, and graph G640 that with the optical fiber for amplification having the relative refractive index difference Δ of 2.00%. In FIG. 7, graph G710 represents the measurement result with the optical fiber for amplification having the core diameter 2a of 12.0 µm, graph G720 that with the optical fiber for amplification having the core diameter 2a of 15.0 µm, graph G730 that with the optical fiber for amplification having the core diameter 2a of 27.0 µm, and graph G740 that with the optical fiber for amplification having the core diameter 2a of 30.0 µm.

As apparent from these FIGS. 6 and 7, the generation efficiency η of nonlinear noise light can be reduced to about 1/10-1/100 with increase of the core diameter 2a. In order to reduce the noise light to a practically acceptable level, the relative value of generation efficiency η of nonlinear noise light needs to be 0.4 or less and more preferably 0.3 or less. From this aspect, the core diameter 2a needs to be 12 µm or more and more preferably 15 µm or more, and the relative refractive index difference Δ of the core region with respect to the cladding region needs to be 2% or more and more preferably 1.5% or more.

The optical fiber for amplifications having the relative refractive index difference Δ above 0.7% showed neither variation nor reduction of output power even when stored in a wound state in the coil form in the bending radius of 15 mm. Even the optical fiber for amplifications having the relative refractive index difference Δ below 0.7% showed neither variation nor reduction of output power when stored in a wound state in the coil form in the bending radius of 50 mm. However, the optical fiber for amplifications having the relative refractive index difference Δ smaller than 0.5% showed variation and reduction of output power with application of slight vibration even when kept almost straight. It is seen from the above that for stabilization of output power, the relative refractive index difference Δ of the core region with respect to the cladding region is preferably 0.5% or more and more preferably 0.7% or more.

Likewise, where the cladding diameter 2b is less than 110 μm, the optical fiber for amplification wound in the coil form shows large variation and reduction of output power. If the cladding diameter 2b is less than 150 μm, it becomes easy to fusion-splice this optical fiber for amplification with another optical fiber having the ordinary cladding diameter of 125 μm.

Figure 8:
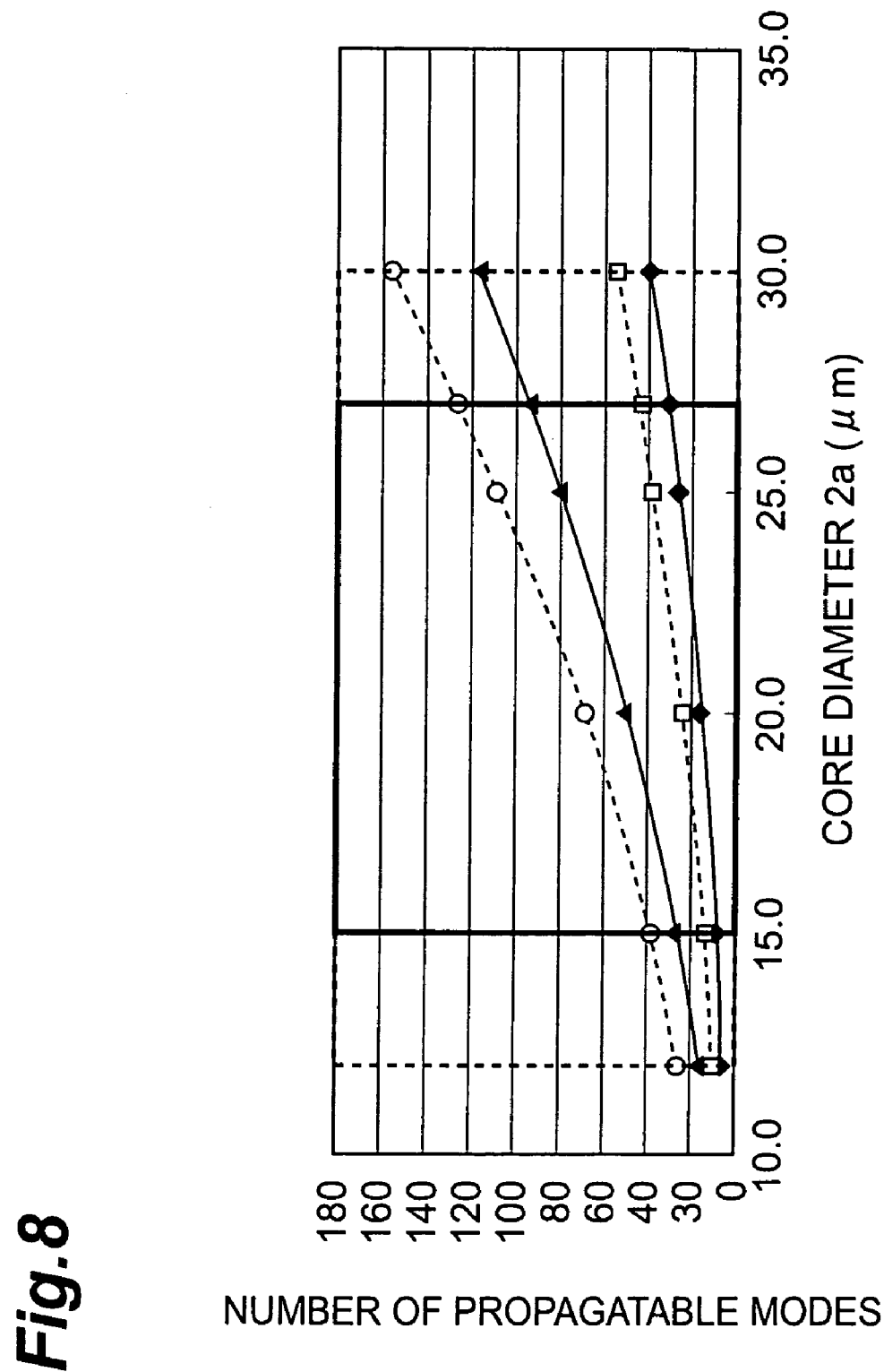
FIG. 8 is a graph showing a relation between core diameter $2a$ and number of propagatable modes, for each of optical fiber for amplifications different in relative refractive index difference $\Delta$.

FIG. 8 is a graph showing the relation between core diameter 2a and the number of propagatable modes, for each of optical fiber for amplifications different in the relative refractive index difference Δ. In FIG. 8, graph G810 represents the measurement result with the optical fiber for amplification having the relative refractive index difference Δ of 0.50%, graph G820 that with the optical fiber for amplification having the relative refractive index difference Δ of 0.70%, graph G830 that with the optical fiber for amplification having the relative refractive index difference Δ of 1.50%, and graph G840 that with the optical fiber for amplification having the relative refractive index difference Δ of 2.00%.

As seen from FIG. 8, the optical fiber for amplifications whose number of propagatable modes was 30 or less showed neither variation nor reduction of output power even when stored in a wound state in the coil form in the bending radius of 15 mm. Even the optical fiber for amplification whose number of propagatable modes was over 30 showed neither variation nor reduction of output power if stored in a wound state in the coil form with the bending radius of 50 mm or more. However, the optical fiber for amplifications whose number of propagatable modes was over 200 showed variation and reduction of output power with application of slight vibration even when kept almost straight. It is seen from the above that for stabilization of output power, the number of propagatable modes is preferably 200 or less and more preferably 130 or less. Furthermore, it follows that the core diameter 2a is preferably 30 μm or less and more preferably 27 μm or less.

The Inventors constructed the optical amplifying apparatus 1 shown in FIG. 1, using the optical fiber for amplification having the structure as described above, and evaluated the performance of the optical amplifying apparatus 1. The number of propagatable modes in the optical fiber for amplification 10 used was 50. The connection fiber 20 disposed between the optical fiber for amplification 10 and the optical coupler 40 has the core diameter of 18 μm, the relative refractive index difference of 0.6%, and the number of propagatable modes of 50. The optical amplifying apparatus 1 to which the optical fiber for amplification 10 as described above was applied provided the output pulsed light with the stable output peak power of about 20 kW or more, using the pumping light of the wavelength of 1.48 μm with the power of 6 W.

Embodiment of Light Source Apparatus

Figure 9:
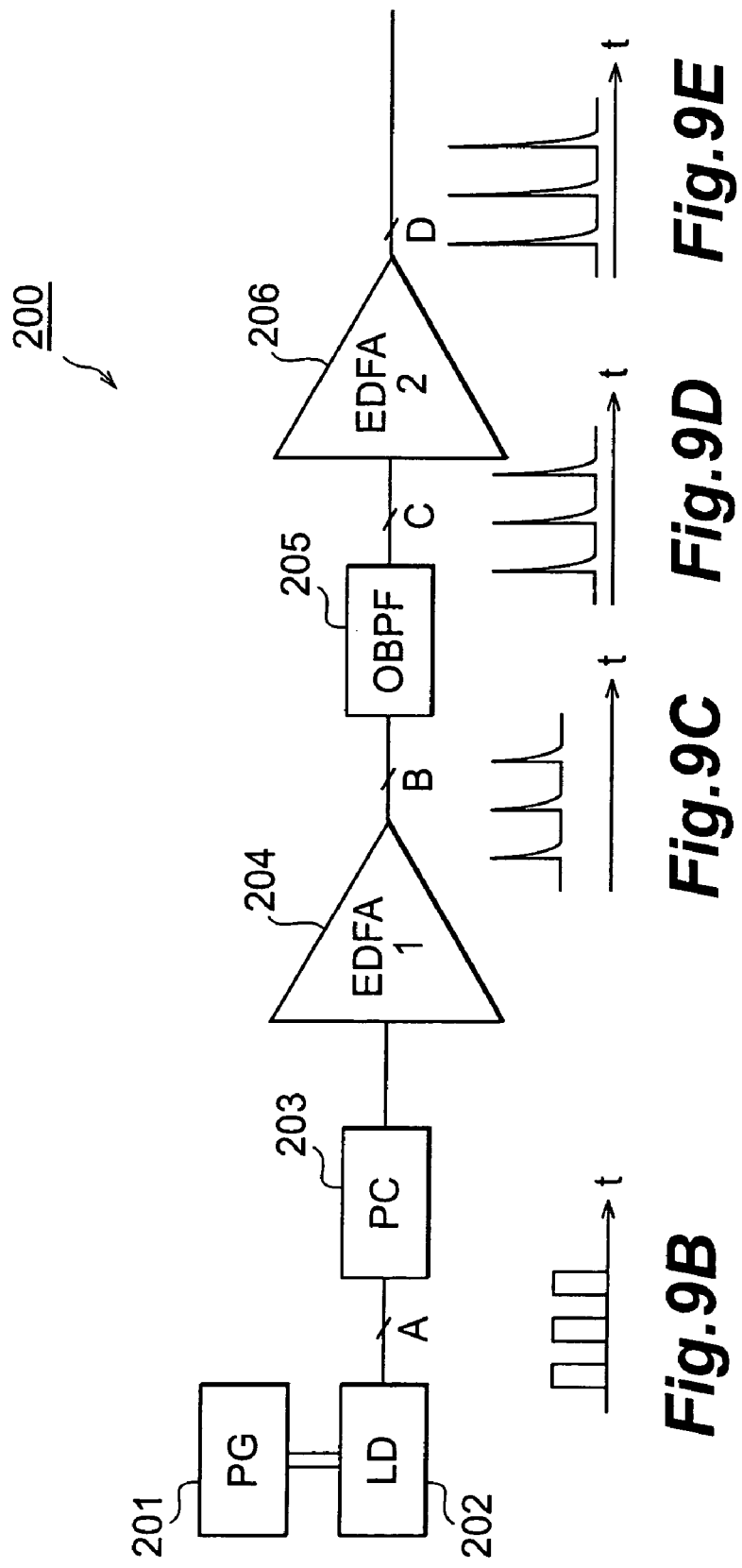
FIG. 9A is an illustration showing a schematic configuration of an example of the light source apparatus according to the present invention.
FIGS. 9B-9E are illustrations showing signal waveforms at respective portions of the light source apparatus shown in FIG. 9A.

Next, an embodiment of the light source apparatus according to the present invention will be described. FIG. 9A is an illustration showing a schematic configuration of an embodiment of a light source apparatus according to the present invention. The light source apparatus 200 shown in FIG. 9A is a pulsed light source including the optical fiber for amplification having the structure as described above (the optical fiber for amplification according to the present invention) and outputting pulsed light. FIGS. 9B-9E show signal waveforms at point A, at point B, at point C, and at point D in the light source apparatus 200 shown in FIG. 9A.

The pulsed light source 200 as the light source apparatus comprises a pulse generator (PG) 201 for generating rectangular electric pulse signals, a laser diode (LD) 202 for generating rectangular optical pulses based on the electric pulse signals, a polarization controller (PC) 203, a first Er-doped fiber amplifier (EDFA) 204, a band-pass filter 205 for removing ASE noise light, and a second Er-doped fiber amplifier 206 including the optical fiber for amplification having the structure as described above (the optical fiber for amplification according to the present invention).

In this pulsed light source 200, the laser diode 202 converts the rectangular electric pulse signals generated by the pulse generator 201, into rectangular optical pulses. The optical pulses outputted from the laser diode 202 are guided via the polarization controller 203 to the first Er-doped fiber amplifier (EDFA) 204 to be amplified thereby. The bandpass filter 205 removes the ASE (noise) light from the amplified pulsed light coming from the first Er-doped fiber amplifier 204 and then the pulsed light is guided to the second Er-doped fiber amplifier 206. Since the second Er-doped fiber amplifier 206 amplifies the input light, the second Er-doped fiber amplifier 206 outputs the pulsed light with high peak power.

Since the optical fiber for amplification according to the present invention is applied to the pulsed light source 200 shown in FIG. 9A, the occurrence of the nonlinear optical phenomena is suppressed well, and the pulsed light is obtained with high power.

Now, we will describe embodiments of the photo-therapy apparatus and exposure apparatus according to the present invention, to which this pulsed light source 200 is applied.

Embodiment of Photo-Therapy Apparatus

Next, an embodiment of a photo-therapy apparatus according to the present invention will be described with reference to FIGS. 10-12. The photo-therapy apparatus according to the present invention includes the pulsed light source 200 having the structure as described above (the light source apparatus according to the present invention). The photo-therapy apparatus is an apparatus for performing ablation of a surface of a cornea under irradiation with a laser beam (PRK: Photorefractive Keratectomy) or ablation of an interior of a dissected cornea (LASIK: Laser Intrastromal Keratomileusis) to correct curvature or unevenness of the cornea, thereby implementing therapy of nearsightedness, astigmatism, or the like.

Figure 10:
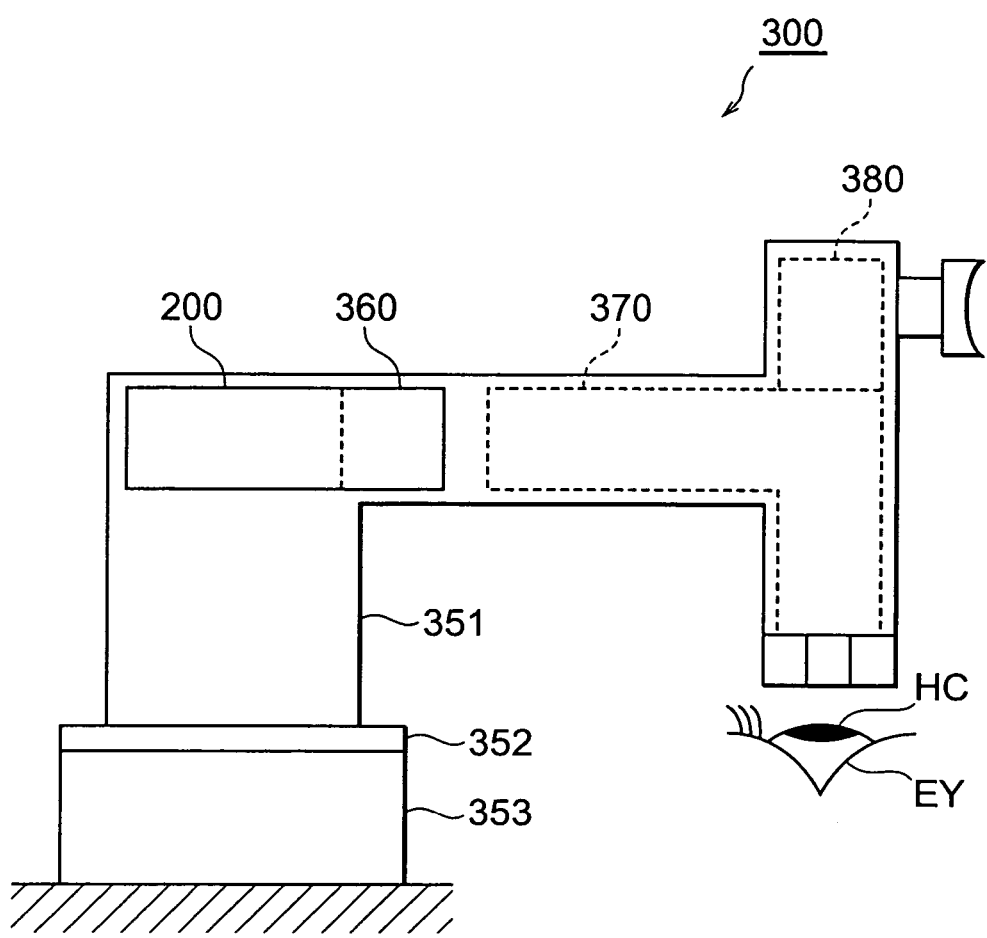
FIG. 10 is an illustration showing a schematic configuration of an embodiment of a photo-therapy apparatus according to the present invention.

FIG. 10 is an illustration showing a schematic configuration of an embodiment of a photo-therapy apparatus according to the present invention. The photo-therapy apparatus 300 shown in FIG. 10 basically comprises the aforementioned pulsed light source 200, a wavelength converter 360 for converting the laser beam amplified by this pulsed light source 200, into a laser beam with a desired wavelength, an irradiation optical device 370 for guiding the laser beam resulting from the wavelength conversion by the wavelength converter 360, to a surface of a cornea HC (part to be treated) in an eye EY, and an observation optical device 380 for observation of the part to be treated, which are installed in an apparatus housing 351. Base part 352 of the apparatus housing 351 is placed on an X-Y moving table 353, and the X-Y moving table 353 enables the whole of apparatus housing 351 to move, in FIG. 10, along both of X-direction corresponding to the lateral direction in the drawing and Y direction perpendicular to the plane of the drawing.

Figure 11:
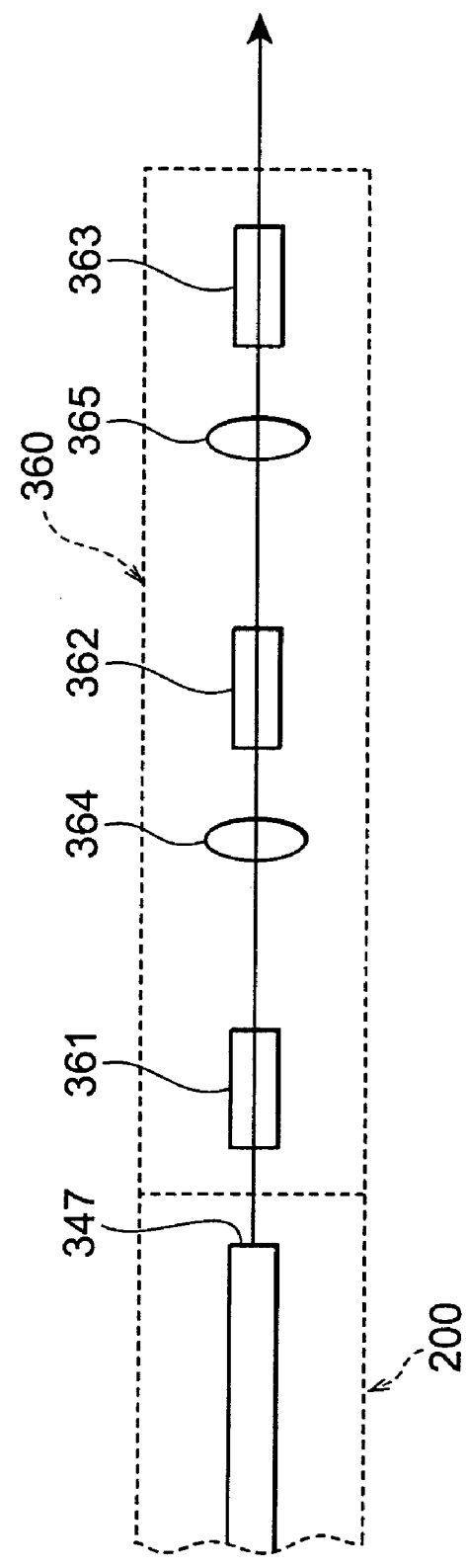
FIG. 11 is an illustration showing a schematic configuration of a wavelength converter constituting a part of the photo-therapy apparatus shown in FIG. 10.

FIG. 11 is an illustration showing a schematic configuration of the wavelength converter 360 forming a part of the photo-therapy apparatus 300. The pulsed light source 200 has the structure as described above, and the laser beam outputted from the output end 347 thereof is converted into a therapy laser beam with a desired wavelength (the wavelength of 193 nm suitable for therapy of cornea in this apparatus, which is the same as the wavelength of the ArF excimer laser) in the wavelength converter 360. The configuration shown in FIG. 11 uses nonlinear optical crystals to convert the fundamental wave of the predetermined wavelength emitted from the output end 347 of the pulsed light source 200 (the wavelength of 1.544 μm in the present embodiment), to the eighth harmonic, thereby generating ultraviolet light of the wavelength of 193 nm which is the same as the wavelength of the ArF excimer laser. The fundamental wave of the wavelength of 1.544 μm (frequency ω) emitted from the output end 347 successively travels from left to right in the drawing through the nonlinear optical crystals 361, 362, and 363. Condenser lenses 364, 365 are placed between the nonlinear optical crystals 361, 362, and 363.

As the fundamental wave passes through the nonlinear optical crystal 361, the second harmonic generation occurs to generate the second harmonic having double the frequency ω of the fundamental wave, i.e., the frequency 2 ω (half wavelength, 772 nm). The second harmonic thus generated travels to the right on the drawing to enter the next nonlinear optical crystal 362. The second harmonic generation again occurs here to generate the fourth harmonic having double the frequency 2 ω of the incident wave, i.e., the frequency 4 ω (quarter wavelength, 386 nm) which is four times the frequency of the fundamental wave. The fourth harmonic thus generated further travels to the right to enter the nonlinear optical crystal 363, and the second harmonic generation again occurs here to generate the eighth harmonic having double the frequency 4 ω of the incident wave, i.e., the frequency 8 ω (one eighth of wavelength, 193 nm) which is eight times the frequency of the fundamental wave.

The nonlinear optical crystals used for the wavelength conversion are, for example, as follows: the nonlinear optical crystal 361 for conversion from the fundamental wave to the second harmonic is an $LiB_3O_5$ (LBO) crystal; the nonlinear optical crystal 362 for conversion from the second harmonic to the fourth harmonic is an $LiB_3O_5$ (LBO) crystal; the nonlinear optical crystal 363 for conversion from the fourth harmonic to the eighth harmonic is an $Sr_2Be_2B_2O_7$ (SBBO) crystal. Here the conversion from the fundamental wave to the second harmonic by use of the LBO crystal enables highly efficient conversion to the second harmonic, because no Walk-off occurs between the fundamental wave and the second harmonic in a method of phase matching for wavelength conversion by temperature regulation of the LBO crystal, and is thus advantageous because the second harmonic generated is free of beam deformation due to Walk-off.

The irradiation optical device 370 and the observation optical device 380 for projecting the laser beam of the wavelength of 193 nm (the laser beam having the same wavelength as the ArF excimer laser beam) after the wavelength conversion by the wavelength converter 360 as described above, onto the surface of the cornea HC of the eye EY will be described with reference to FIG. 12. In the pulsed light source 200 the solid state laser is comprised of a DFB semiconductor laser or a fiber laser having the lasing wavelength in the range of 1.51 μm to 1.59 μm, and the wavelength converter 360 converts the laser beam of the wavelength from the solid state laser, into the laser beam of the eighth harmonic within the range of 189 nm to 199 nm. The laser beam after the wavelength conversion as described above has the wavelength almost identical with that of the ArF excimer laser beam, and the repetition frequency of pulse oscillation thereof is very high, 100 kHz.

Figure 12:
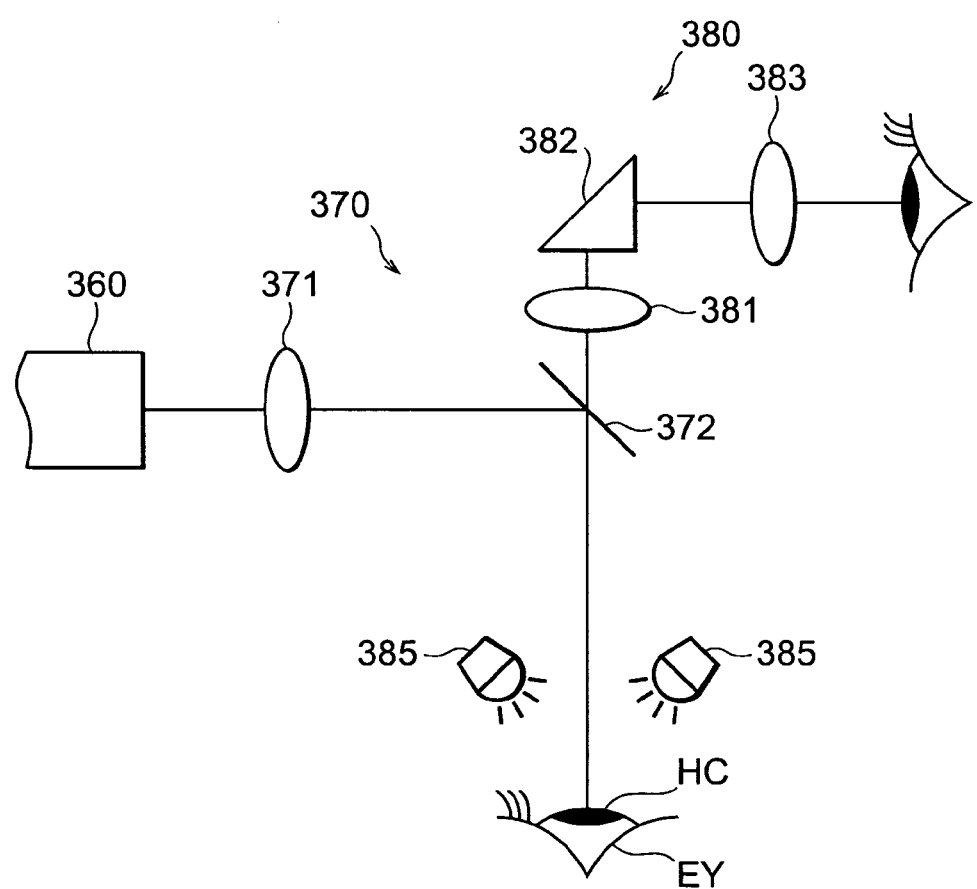
FIG. 12 is an illustration showing a schematic configuration of an irradiation optical device and an observation optical device constituting a part of the photo-therapy apparatus shown in FIG. 10.

FIG. 12 is an illustration showing a schematic configuration of an irradiation optical device and an observation optical device constituting a part of the photo-therapy apparatus according to the present invention. The irradiation optical device 370 comprises a condenser lens 371 for condensing the laser beam of the wavelength of 193 nm resulting from the wavelength conversion by the wavelength converter 360 from the light emitted from the pulsed light source 200, into a thin beam, and a dichroic mirror 372 for reflecting the beam of laser light thus condensed, to project the laser beam onto the surface of the cornea HC of the eye EY as an object to be treated. In this configuration, the laser beam is projected in the form of spot light onto the surface of the cornea HC to implement evaporation of this part. At this time, the whole of the apparatus housing 351 is moved in the X-direction and Y-direction by the X-Y moving table 353 to move the laser beam spot to scan on the surface of the cornea HC, thereby implementing ablation of the surface of the cornea as a treatment of nearsightedness, astigmatism, farsightedness, or the like.

The treatment is carried out by an operator such as an ophthalmologist by controlling the operation of the X-Y moving table 353 while visually observing the treated part through the observation optical device 380. This observation optical device 380 comprises an illumination lamp 385 for illuminating the surface of the cornea HC of the eye EY as an object to be treated, an objective lens 381 for receiving light from the cornea HC illuminated by the illumination lamp 385, through the dichroic mirror 372, a prism 382 for reflecting the light from the objective lens 381, and an eyepiece lens 383 for receiving the light, and permits the operator to observe an enlarged image of the cornea HC through the eyepiece lens 383.

Embodiment of Exposure Apparatus

Figure 13:
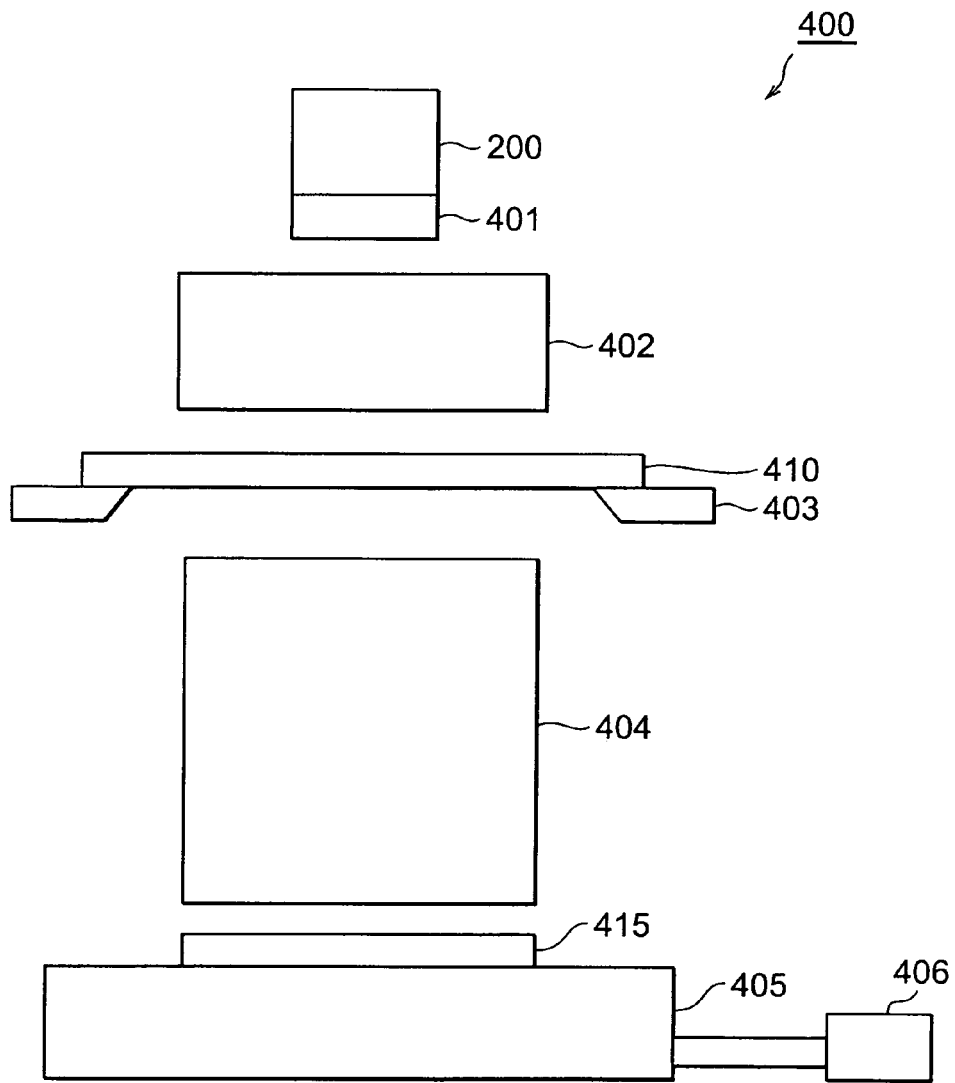
FIG. 13 is an illustration showing a schematic configuration of an embodiment of an exposure apparatus according to the present invention.

Next, an embodiment of an exposure apparatus according to the present invention will be described. FIG. 13 is an illustration showing a schematic configuration of the exposure apparatus according to the present invention. The exposure apparatus 400 shown in FIG. 13 includes the aforementioned pulsed light source 200, and is used in the photolithography step being one of semiconductor production steps. The exposure apparatus used in the photolithography step operates theoretically in the same manner as photoengraving, to optically project a device pattern precisely drawn on a photomask (reticle), onto an object such as a semiconductor wafer or a glass substrate coated with a photoresist, thereby transcribing the device pattern onto the object. The exposure apparatus 400 comprises the aforementioned pulsed light source 200, a wavelength converter 401, an illumination optical system 402, a mask support (first stage) 403 capable of holding a photomask (reticle) 410, a projection optical system 404, a mount (second stage) 405 capable of holding a semiconductor wafer 415, and a driving unit 406 for horizontally moving the mount 405.

In the exposure apparatus 400, a laser beam emitted from the output end of the pulsed light source 200 is fed into the wavelength converter 401 to be converted into a laser beam of a wavelength necessary for exposure of the semiconductor wafer 415. The laser beam resulting from the wavelength conversion as described above travels through the illumination optical system 402 composed of a plurality of lenses, to irradiate the entire surface of photomask 410 supported on the mask support 403. The beam having passed through the photomask 410 has the image information of the device pattern drawn on the photomask 410, and this light travels through the projection optical system 404 to impinge on a predetermined position of the semiconductor wafer 415 mounted on the mount 405. At this time, the projection optical system 404 image-forms and exposures a demagnified image of the device pattern of the photomask 410 on the semiconductor wafer 415.

Other Embodiments

The present invention can be modified in various ways, without being limited to the above embodiments. For example, a fiber preform for the production of the optical fiber for amplification by drawing may be produced by any other production method (VAD, OVD, PCVD, sol-gel process, or the like), without being limited to the MCVD process.

The above embodiments were described as to the Er doped fiber, but it is also possible to apply an optical fiber doped with another rare-earth element such as Yb or Nd. In addition, the relative refractive index difference of the core region with respect to the cladding region does not have to be uniform and in that case, the values presented in the above embodiments should be considered as effective values. The entire core region does not always have to be doped with the rare-earth element.

The light source apparatus according to the present invention may also be applied to CW light sources for emitting continuous light, without being limited to the pulsed light sources.

As described above, the optical fiber for amplification according to the present invention comprises the core region doped with the rare-earth element, and the cladding region provided on the outer periphery of the core region and having the refractive index lower than that of the core region. Furthermore, the core region has the outer diameter of 10 μm or more but 30 μm or less and the relative refractive index difference of 0.5% or more but 2.0% or less with respect to the cladding region, and the cladding region has the outer diameter of 75 μm or more but 200 μm or less. The optical fiber for amplification of this configuration enables achievement of the increase of power of output light, the suppression of occurrence of the nonlinear optical phenomena, and the compact storage all together.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifying apparatus comprising:
    an optical fiber for amplification comprising: a core region extending along a predetermined axis, and a single cladding region which is in direct contact with an outer periphery of said core region and whose outer periphery is an outer periphery of said optical fiber for amplification;
    a pumping light supplier for supplying pumping light to said optical fiber for amplification; and
    a first connection fiber provided between said optical fiber for amplification and an entrance fiber provided on a light entrance end side of said optical fiber for amplification, said first connection fiber having a mode field diameter larger than a mode field diameter of said entrance fiber but smaller than a mode field diameter of said optical fiber for amplification,
    wherein said core region is doped with a rare-earth element, said core region having an outer diameter of 10 μm or more but 30 μm or less, and a relative refractive index difference of 0.5% or more but 2.0% or less with respect to said single cladding region, and
    wherein said single cladding region has a refractive index lower than that of said core region, said cladding region having an outer diameter of 75 μm or more but 200 μm or less.

2. An optical amplifying apparatus according to claim 1, wherein said core region has the outer diameter of 15 μm or more but 27 μm or less.

3. An optical amplifying apparatus according to claim 1, wherein said single cladding region has the outer diameter of 110 μm or more but 150 μm or less.

4. An optical amplifying apparatus according to claim 1, wherein the relative refractive index difference of said core region with respect to said single cladding region is 0.7% or more but 1.5% or less.

5. An optical amplifying apparatus according to claim 1, wherein the rare-earth element in said core region includes Er.

6. An optical amplifying apparatus according to claim 5, wherein a doping concentration of Er in said core region is 800 wt.ppm or more.

7. An optical amplifying apparatus according to claim 5, said optical fiber for amplification has an absorption loss peak of 20 dB/m or more but 80 dB/m or less, near a wavelength of 1530 nm.

8. An optical amplifying apparatus according to claim 1, wherein said optical fiber for amplification is wound in a coil form with a minimum bending radius of 15 mm or more.

9. An optical amplifying apparatus comprising:
    an optical fiber for amplification comprising: a core region extending along a predetermined axis, and a single cladding region which is in direct contact with an outer periphery of said core region and whose outer periphery is an outer periphery of said optical fiber for amplification;
    a pumping light supplier for supplying pumping light to said optical fiber for amplification; and
    a connection fiber provided between said optical fiber for amplification and an exit fiber provided on a light exit end side of said optical fiber for amplification, said connection fiber having a mode field diameter larger than a mode field diameter of said exit fiber but smaller than a mode field diameter of said optical fiber for amplification,
    wherein said core region is doped with a rare-earth element, said core region having an outer diameter of 10 μm or more but 30 μm or less, and a relative refractive index difference of 0.5% or more but 2.0% or less with respect to said single cladding region, and
    wherein said single cladding region has a refractive index lower than that of said core region, said cladding region having an outer diameter of 75 μm or more but 200 μm or less.

* * * * *